United States Patent
Sato

(10) Patent No.: US 11,161,513 B2
(45) Date of Patent: Nov. 2, 2021

(54) DRIVING CONTROL APPARATUS FOR VEHICLE

(71) Applicant: Suzuki Motor Corporation, Hamamatsu (JP)

(72) Inventor: Katsuhiko Sato, Hamamatsu (JP)

(73) Assignee: SUZUKI MOTOR CORPORATION

( * ) Notice: Subject to any disclaimer, the term of this patent is extended or adjusted under 35 U.S.C. 154(b) by 0 days.

(21) Appl. No.: 16/862,017

(22) Filed: Apr. 29, 2020

(65) Prior Publication Data
US 2020/0369281 A1 Nov. 26, 2020

(30) Foreign Application Priority Data
May 21, 2019 (JP) .............................. JP2019-095192

(51) Int. Cl.
*B60W 30/18* (2012.01)
*G08G 1/00* (2006.01)
(Continued)

(52) U.S. Cl.
CPC ...... *B60W 30/18163* (2013.01); *B60W 10/20* (2013.01); *B60W 30/143* (2013.01);
(Continued)

(58) Field of Classification Search
CPC ........... B60W 30/18163; B60W 10/20; B60W 30/143; G01C 21/3407; G01C 21/3691; G05D 1/0212; G08G 1/20
See application file for complete search history.

(56) References Cited

U.S. PATENT DOCUMENTS 9,775,004 B2 * 9/2017 Cawse .................. G07B 15/00
2005/0015203 A1 * 1/2005 Nishira ................. G08G 1/167
701/301
(Continued)

FOREIGN PATENT DOCUMENTS

JP 2009149255 A 7/2009
JP 2012096569 A 5/2012
(Continued)

OTHER PUBLICATIONS

Preliminary Search Report including Written Opinion for French Application No. FR2004232 dated Sep. 16, 2021; 11 pages.

*Primary Examiner* — Hussein Elchanti
(74) *Attorney, Agent, or Firm* — Lerner, David, Littenberg, Krumholz & Mentlik, LLP

(57) ABSTRACT

An automated driving controller for a vehicle includes an environmental condition estimating part including a surrounding recognition function for recognizing a vehicle's driving lane, neighboring lanes, and other vehicles driving in the driving lanes and a function for obtaining the vehicle's moving state, a path generating part for generating a target path on the basis of information obtained by the environmental condition estimating part, and a vehicle control part configured to perform speed control and steering control for causing the vehicle to follow the target path, and has a function for performing automated lane change to a neighboring lane when there is no other vehicle in a predetermined range of the neighboring lane and a function for determining whether lane change should be continued when another vehicle is recognized in a predetermined area (XF and XR) around the vehicle during execution of the automated lane change.

6 Claims, 7 Drawing Sheets

(51) Int. Cl.
  *B60W 10/20* (2006.01)
  *G01C 21/36* (2006.01)
  *B60W 30/14* (2006.01)
  *G01C 21/34* (2006.01)
  *G05D 1/02* (2020.01)

(52) U.S. Cl.
  CPC ..... *G01C 21/3407* (2013.01); *G01C 21/3691* (2013.01); *G05D 1/0212* (2013.01); *G08G 1/20* (2013.01)

(56) References Cited

U.S. PATENT DOCUMENTS

| | | | |
|---|---|---|---|
| 2010/0161192 A1* | 6/2010 | Nara | G01C 21/26 701/70 |
| 2011/0190972 A1 | 8/2011 | Timmons et al. | |
| 2012/0109415 A1 | 5/2012 | Nitta et al. | |
| 2015/0070501 A1 | 3/2015 | Ooi | |
| 2015/0154861 A1 | 6/2015 | Hillenbrand | |
| 2015/0360684 A1 | 12/2015 | Matsuno et al. | |
| 2016/0101778 A1 | 4/2016 | Hasberg et al. | |
| 2016/0132055 A1 | 5/2016 | Matsuno et al. | |
| 2017/0018189 A1* | 1/2017 | Ishikawa | G05D 1/0088 |
| 2017/0248959 A1 | 8/2017 | Matsubara et al. | |
| 2017/0320521 A1* | 11/2017 | Fujita | B62D 6/00 |
| 2018/0354518 A1* | 12/2018 | Inou | G05D 1/0214 |
| 2019/0071099 A1* | 3/2019 | Nishiguchi | B62D 15/0255 |
| 2019/0084572 A1* | 3/2019 | Oishi | B60W 10/00 |
| 2019/0143983 A1 | 5/2019 | Hashimoto et al. | |
| 2019/0193737 A1* | 6/2019 | Likhachev | B60W 60/00274 |
| 2019/0227546 A1 | 7/2019 | Sato | |

FOREIGN PATENT DOCUMENTS

| | | |
|---|---|---|
| JP | 2013232079 A | 11/2013 |
| JP | 201522423 A | 2/2015 |
| JP | 2016004443 A | 1/2016 |
| JP | 2016088383 A | 5/2016 |
| JP | 2016097827 A | 5/2016 |
| JP | 2018030479 A | 3/2018 |
| JP | 2018151287 A | 9/2018 |
| JP | 2018158684 A | 10/2018 |
| JP | 2019051894 A | 4/2019 |
| JP | 2019127136 A | 8/2019 |

* cited by examiner

DRIVING CONTROL APPARATUS FOR VEHICLE

CROSS-REFERENCE TO RELATED APPLICATIONS

This application claims the benefit of the filing date of Japanese Patent Application No. 2019-095192, filed on May 21, 2019, the disclosure of which is hereby incorporated herein by reference.

BACKGROUND OF THE INVENTION

Technical Field

The present invention relates to a driving control apparatus for a vehicle, and more particularly, relates to a driving control apparatus included in an automated lane change system.

Background Art

A variety of techniques for reducing burdens on drivers and for safe-driving support, for example, adaptive cruise control systems (ACCS) and lane keeping assistance systems (LKAS), have been put into practical use. Furthermore, the practical application and international standardization of a "partially automated in-lane driving system (PADS)" and a "partially automated lane change system (PALS)" based on these techniques are being promoted.

For example, JP 2018-158684 A discloses a driving control apparatus for a vehicle that has a function for determining whether to continue a lane change on the basis of the vehicle's own position with respect to a lane marking with a neighboring lane when another vehicle that enters a predetermined area around the vehicle is recognized during execution of automated lane change, and a function for returning to an original lane if it is determined that the lane change should not be continued.

BRIEF SUMMARY OF THE INVENTION

Problems to be Solved by the Invention

The automated lane change function as described above can also be used for lane change at the time of diverging from a main line to a diverging lane and lane change at the time of merging from a merging lane to the main line at an interchange and a junction. However, there are problems, for example, when another vehicle that enters the predetermined area around the vehicle is recognized during automated lane change to a diverging lane, if a lane change cancellation (original lane return) function operates, it is not possible to shift to the diverging lane, contrary to driver's intention.

The present invention has been made in view of the above-described actual situation, and an object is to prevent unintended lane change cancellation and original lane return during automated lane change for purposes such as diverging and merging.

Means for Solving the Problems

In order to solve the above-described problems, the present invention is a driving control apparatus for a vehicle, including:
an environmental condition estimating part including a surrounding recognition function for recognizing a vehicle's own driving lane, neighboring lanes, and other vehicles driving in the driving lanes, and a function for obtaining the vehicle's moving state;
a path generating part for generating a target path on the basis of information obtained by the environmental condition estimating part; and
a vehicle control part configured to perform speed control and steering control for causing the vehicle to follow the target path, and having:
a function for performing automated lane change to a neighboring lane when there is no other vehicle in a predetermined range of the neighboring lane; and
a function for determining whether lane change should be continued when another vehicle is recognized in a predetermined area around the vehicle during execution of the automated lane change,
wherein the driving control apparatus has a function for altering the predetermined area serving as a criterion of the continuation determination of lane, when the vehicle's own position is in a specific section including a lane diverging section during execution of the automated lane, to a second predetermined area smaller than the predetermined area when the vehicle's own position is in a general section other than the specific section.

Advantageous Effects of Intervention

According to the driving control apparatus for the vehicle according to the present invention, because when the vehicle's own position is in the specific section including the lane diverging section during execution of the automated lane change, the predetermined area serving as the criterion of the lane change continuation determination is changed to a second predetermined area smaller than that when the vehicle's own position is in the general area, even if another vehicle entering the predetermined area around the vehicle is recognized during lane change, if the other vehicle is outside the second predetermined area, automated lane change continues and operation of the lane change cancellation (original lane return) function is avoided, and thereby a situation in which it is not possible to shift to the diverging lane, contrary to the driver's intention, is suppressed, and it is advantageous in that a practical solution in consideration of the purpose of lane change is provided for problems such as interruption of other vehicles during lane change.

DETAILED DESCRIPTION

Hereinafter, an embodiment of the present invention will be described in detail with reference to the drawings.

Figure 1:
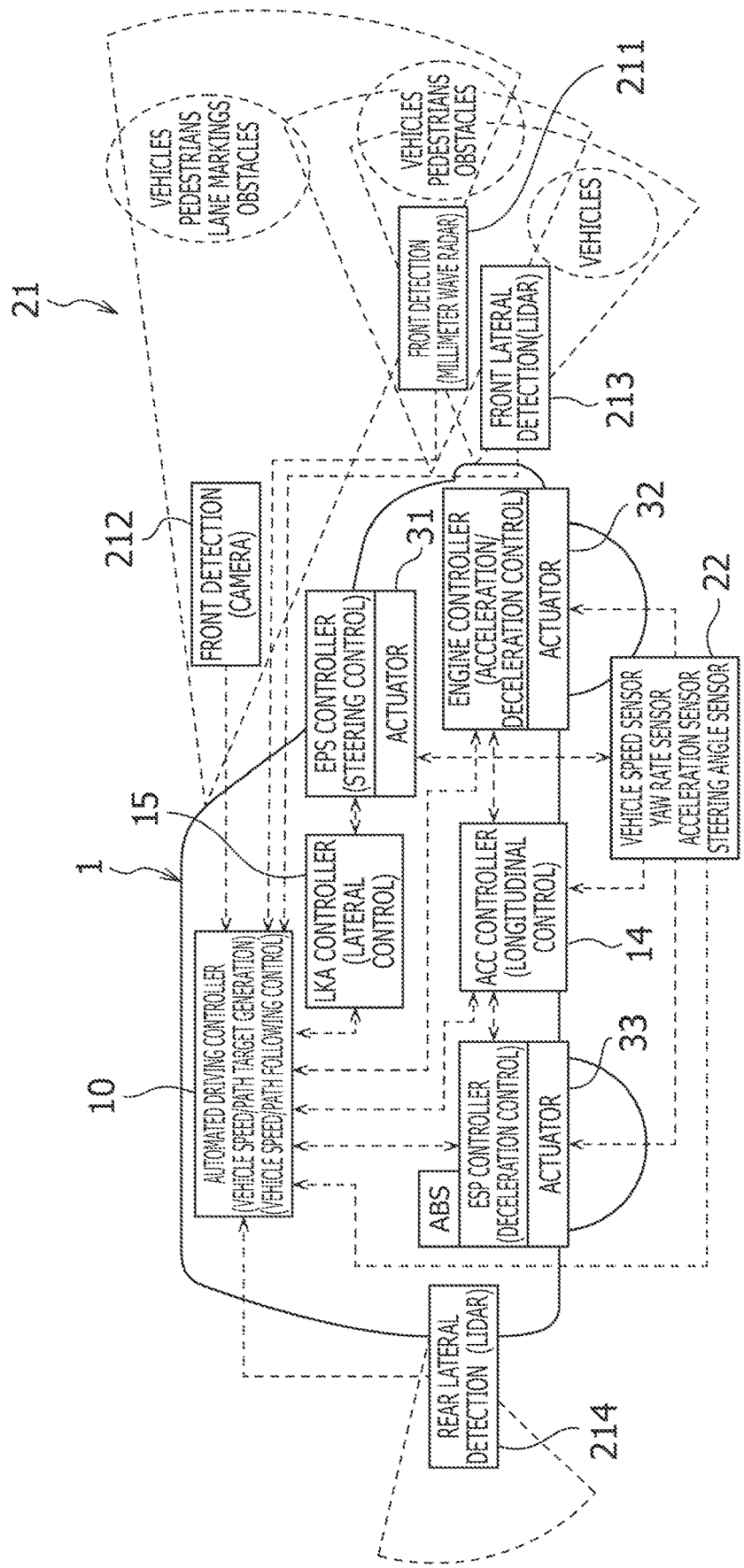
FIG. 1 is a schematic view showing a driving control system of a vehicle.

In FIG. 1, a vehicle 1 equipped with a driving control system according to the present invention includes, in addition to common components, such as an engine and a vehicle body, of an automobile, an external sensor 21 for detecting a vehicle surrounding environment, an internal sensor 22 for detecting vehicle information, a controller/actuator group for speed control and steering control, an ACC controller 14 for inter-vehicle distance control, an LKA controller 15 for lane keeping support control, and an automated driving controller 10 for controlling them, performing path following control, and executing partially automated in-lane driving (PADS) and automated lane change (PALS) in order to perform, at the vehicle side, recognition, determination, and operation conventionally performed by a driver.

The controller/actuator group for speed control and steering control includes an EPS (Electric Power Steering) controller 31 for steering control, an engine controller 32 for acceleration/deceleration control, and an ESP/ABS controller 33. An ESP (registered trademark; Electronic Stability Program) includes an ABS (Antilock Brake System) to form a stability control system (vehicle behavior stabilization control system).

The external sensor 21 is composed of a plurality of detection means for inputting lane markings on a road defining the vehicle's own driving lane and the neighboring lane, and presence of and relative distance from other vehicles, obstacles, people, and the like around the vehicle into the automated driving controller 10 as image data or point cloud data.

Figure 2:
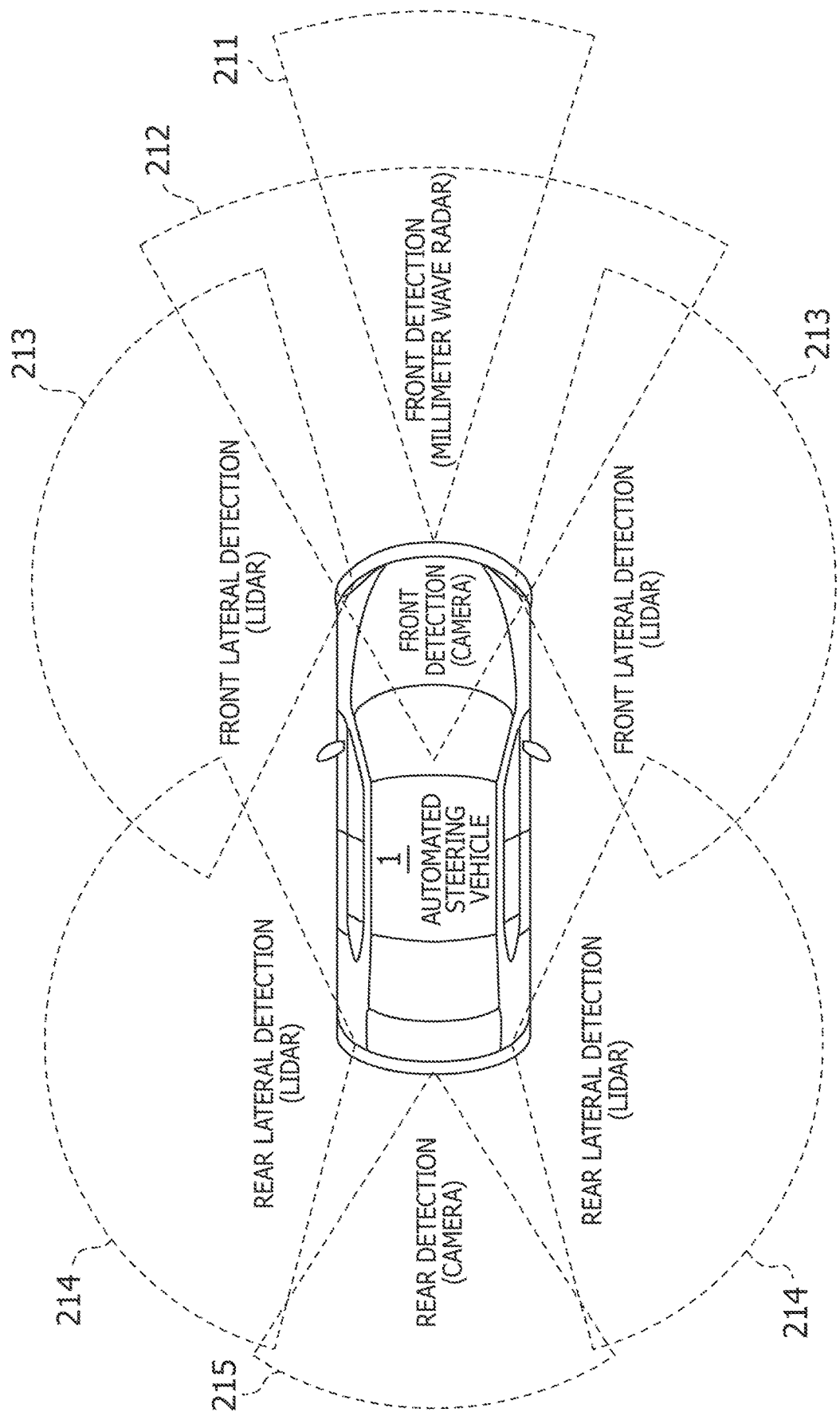
FIG. 2 is a schematic plan view showing an external sensor group of the vehicle.

For example, as shown in FIG. 2, the vehicle 1 includes a millimeter wave radar (211) and a camera (212) as forward detection means 211 and 212, LIDARs (Laser Imaging Detection And Ranging) as front lateral direction detection means 213 and rear lateral direction detection means 214, and a camera (back camera) as rearward detection means 215, covers 360 degrees around the vehicle, and can detect positions of and distance from vehicles, obstacles and the like, and lane marking positions within a predetermined distance in the front, rear, left, and right directions of the vehicle.

Figure 3:
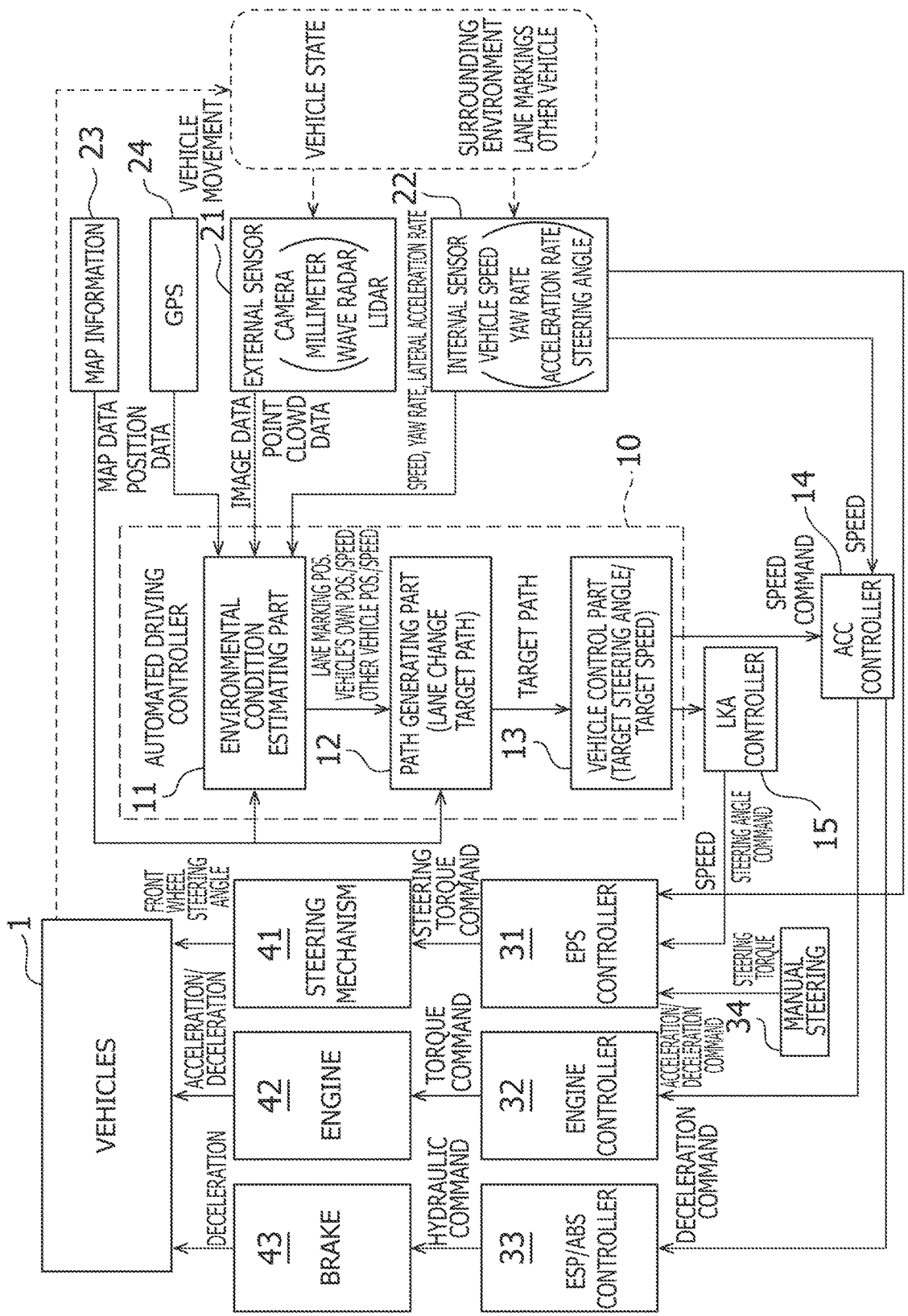
FIG. 3 is a block diagram showing the driving control system of the vehicle.

The internal sensor 22 is composed of a plurality of detection means, such as a vehicle speed sensor, a yaw rate sensor and an acceleration sensor, for measuring physical quantities representing the movement state of the vehicle, and their measurement values are input into the automated driving controller 10, ACC controller 14, LKA controller 15, and EPS controller 31 as shown in FIG. 3.

The automated driving controller 10 includes an environmental condition estimating part 11, a path generating part 12 and a vehicle control part 13, and includes a computer for performing functions as described below, that is, a ROM storing programs and data, a CPU for performing arithmetic processing, a RAM for reading out the programs and data, and storing dynamic data and arithmetic processing results, an input/output interface, and the like.

The environmental condition estimating part 11 acquires the absolute position of the vehicle itself by matching the vehicle's own position information by positioning means 24 such as a GPS and map information, and on the basis of external data such as the image data and point cloud data obtained by the external sensor 21, estimates positions of lane markings of the vehicle's own driving lane and the neighboring lane, and positions and speeds of other vehicles. In addition, it acquires the movement state of the vehicle itself from internal data measured by the internal sensor 22.

The path generating part 12 generates a target path from the vehicle's own position estimated by the environmental condition estimating part 11 to an arrival target. It refers to map information 23 and generates a target path from the vehicle's own position to an arrival target point in lane change on the basis of the positions of the lane markings of the neighboring lane, the positions and speeds of the other vehicles, and the movement state of the vehicle itself estimated by the environmental condition estimating part 11.

The vehicle control part 13 calculates a target speed and a target steering angle on the basis of the target path generated by the path generating part 12, transmits a speed command for constant speed cruise or inter-vehicle distance keeping and following cruise to the ACC controller 14, and transmits a steering angle command for path following to the EPS controller 31 via the LKA controller 15.

The vehicle speed is also input into the EPS controller 31 and ACC controller 14. Because a steering torque changes according to the vehicle speed, the EPS controller 31 refers to a steering angle-steering torque map for each vehicle speed and transmits a torque command to a steering mechanism 41. The engine controller 32, ESP/ABS controller 33, and EPS controller 31 control an engine 42, a brake 43, and the steering mechanism 41, and thereby control movement of the vehicle 1 in a longitudinal direction and a lateral direction.

Outline of Partially Automated In-Lane Driving System

Next, partially automated in-lane driving (PADS driving) by a partially automated in-lane driving system (PADS) is enabled in a state in which both ACC controller 14 included in the ACCS and LKA controller 15 included in the LKAS are operating together with the automated driving controller 10.

At the same time as operation of the partially automated in-lane driving system, the automated driving controller 10 (path generating part 12) generates a target path within a single lane and a target speed on the basis of the external information (lanes, vehicle position, and positions and speeds of other vehicles driving in the lane and neighboring lane) obtained by the environmental condition estimating part 11 through the external sensor 21, and the internal information (vehicle speed, yaw rate, and acceleration) obtained by the internal sensor 22.

The automated driving controller 10 (vehicle control part 13) estimates the speed, attitude, and lateral displacement of the vehicle after $\Delta t$ seconds from a relationship between a yaw rate y and lateral acceleration ($d^2y/dt^2$) occurring due to vehicle movement by the vehicle's own position and movement characteristics of the vehicle itself, that is, a front wheel steering angle $\delta$ occurring when a steering torque T is applied to the steering mechanism 41 during traveling at a vehicle speed V, gives a steering angle command that makes the lateral displacement to "yt" after $\Delta t$ seconds to the EPS controller 31 via the LKA controller 15, and gives a speed command that makes the speed to "Vt" after Δt seconds to the ACC controller 14.

Although the ACC controller 14, LKA controller 15, EPS controller 31, engine controller 32, and ESP/ABS controller 33 operate independently of automatic steering, they are also operable according to command input from the automated driving controller 10 while a partially automated in-lane driving function (PADS) and a partially automated lane change system (PALS) are operating.

The ESP/ABS controller 33 that has received a deceleration command from the ACC controller 14 issues a hydraulic command to an actuator and controls braking force of the brake 43 to control the vehicle speed. In addition, an engine controller 32 that has received an acceleration/deceleration command from the ACC controller 14 controls an actuator output (degree of throttle opening) to give the engine 42 a torque command and controls driving force to control the vehicle speed.

The ACC function (ACCS) functions with combination of hardware and software, such as the millimeter wave radar as the forward detection means 211 included in the external sensor 21, ACC controller 14, engine controller 32, and ESP/ABS controller 33 and the like.

That is, in a case in which there is no vehicle ahead, the ACC function performs constant speed cruise by setting a cruise control set speed as the target speed; and in a case of having caught up with the vehicle ahead (in a case in which a speed of the vehicle ahead is slower than the cruise control set speed), the ACC function performs following cruise following the vehicle ahead while maintaining an inter-vehicle distance corresponding to a time gap (inter-vehicle time=inter-vehicle distance/speed of vehicle) set in accordance with the speed of the vehicle ahead.

The LKA function (LKAS) detects the lane markings and the vehicle's own position by the environmental condition estimating part 11 of the automated driving controller 10 on the basis of image data obtained by the external sensor 21 (cameras 212 and 215), and performs steering control by the LKA controller 15 and EPS controller 31 so as to be able to drive at a lane center.

That is, the EPS controller 31 that has received the steering angle command from the LKA controller 15 refers to a vehicle speed-steering angle-steering torque map, issues a torque command to an actuator (EPS motor), and gives a front wheel steering angle targeted by the steering mechanism 41.

The partially automated in-lane driving function (PADS) is implemented by combining longitudinal control (speed control and inter-vehicle distance control) by the ACC controller 14 and lateral control (steering control and lane keeping driving control) by the LKA controller 15 as described above.

Outline of Partially Automated Lane Change System

Next, an outline of the partially automated lane change system (PALS) will be explained on the assumption of lane change from a state of partially automated in-lane driving (PADS driving) on a highway with two or more lanes on one side with a median.

The partially automated lane change system (PALS) is a system that automatically performs lane change by determination of the system itself or the driver's instructions or approval, and is implemented by combining longitudinal control (speed control and inter-vehicle distance control) by the ACC controller 14 and lateral control (target path following control by automatic steering) by the LKA controller 15 in the same way as partially automated driving (PADS driving).

At the same time as operation of the partially automated lane change system, the automated driving controller 10 (path generating part 12) constantly generates a target path for changing lanes from a currently driving lane to a neighboring lane on the basis of the external information (lane markings of the lane and neighboring lane, and positions and speeds of other vehicles driving in the lane and neighboring lane) obtained by the environmental condition estimating part 11 through the external sensor 21, and the internal information (vehicle speed, yaw rate, and acceleration) obtained by the internal sensor 22.

The automated lane change target path is a path that leads to a state of driving at the center of the neighboring lane by performing lane change from the currently driving lane, regarding other vehicles driving in the neighboring lane, their future positions and speeds are predicted, and automated lane change to the neighboring lane is executed by automatic steering by determination of the system or the driver's lane change instructions or approval by blinker operation or the like in a situation in which it is determined that there is no other vehicle in a front predetermined area ZF, a rear predetermined area ZR, and a lateral predetermined area ZL of the neighboring lane set according to speed of the vehicle.

The front predetermined area ZF and rear predetermined area ZR correspond to inter-vehicle distance that should be secured from another vehicle in front of and at the back of the vehicle, that is, front predetermined distance XF and rear predetermined distance XR, and they are calculated by the following expressions, respectively.

Front predetermined distance (XF)=inter-vehicle distance (S)+vehicle head time (TH C×speed of the vehicle (V), where, inter-vehicle distance (S)=speed of the vehicle (V)×inter-vehicle time (TG);
vehicle head time (TH)=vehicle head distance/V=TTC×ΔV/V;
TTC=ΔV/maximum deceleration of the vehicle ($D_{max}$); and
ΔV=V−Vf, where Vf denotes speed of the vehicle ahead.

Rear predetermined distance (XR)=vehicle head time (TH)×speed of vehicle behind (Vr),
where, vehicle head time (TH)=vehicle head distance/V=TTC×ΔV/V;
TTC=ΔV/deceleration of vehicle behind (Dr); and
ΔV=Vr−V, where Vr denotes speed of the vehicle behind.

As is clear from the above, since the front predetermined distance (XF) and rear predetermined distance (XR) vary depending on the speeds V, VF, and Vr of the vehicle, vehicle ahead, and vehicle behind, respectively, a lookup table storing calculated values for each of the speed of the vehicle (V) and relative speed (ΔV) for each is prepared, and corresponding values are applied by a reference process.

The front predetermined area ZF is an area defined by the longitudinal direction: the front predetermined distance XF×the lateral direction: width of the driving lane+width of the neighboring lane, and the rear predetermined area ZR is an area defined by the longitudinal direction: the rear predetermined distance XR×the lateral direction: width of the driving lane+width of the neighboring lane. In addition, the lateral predetermined area ZL is an area defined by the longitudinal direction: vehicle length×the lateral direction: width of the neighboring lane.

Lane Change Continuation Determination during Automated Lane Change

As described above, in the state in which the vehicle surrounding environment and target path are confirmed and an automated lane change possible flag is set, automated lane change is executed by the driver's lane change instructions or determination of the system, but there is also a possibility that the surrounding environment may change due to behavior of another vehicle during a period from starting lane change after blinking a blinker to moving to the neighboring lane.

Therefore, also during automated lane change, monitoring of the periphery of the vehicle is continued by external information obtained by the environmental condition estimating part 11 through the external sensor 21, and if intrusion (interruption) of another vehicle into the front predetermined area ZF, rear predetermined area ZR, or lateral predetermined area ZL is confirmed, the automated driving controller 10 determines whether lane change should be continued or cancelled on the basis of the vehicle's own position during lane change.

If it is determined that lane change cannot be continued and lane change is cancelled, the automated driving controller 10 (path generating part 12) changes the following target to the center line of the lane (original lane) in which the vehicle was driving before lane change to regenerate a target path and vehicle speed, and the vehicle control part 13 gives a steering angle command to the EPS controller 31 and a speed command to the ACC controller 14 for causing the vehicle to follow the regenerated target path, and thereby the vehicle returns to the original lane by automatic steering (automated lane return function).

Even if intrusion (interruption) of another vehicle into the front predetermined area ZF, rear predetermined area ZR, or lateral predetermined area ZL is confirmed, when the vehicle has almost moved to the neighboring lane, for example, when three or more of four wheels have entered the neighboring lane crossing the lane marking, lane change is not cancelled and lane change continues. If it is determined that continuation of lane change is difficult, an operation takeover request is notified, automated lane change is cancelled, and authority is transferred to the driver. If the driver cannot take over, a minimal risk maneuver (MRM) is performed.

Unintended Original Lane Return during Lane Change in Specific Section

As described already, the partially automated lane change system (PALS) can also be used for lane change at the time of diverging from a main line to a diverging lane and lane change at the time of merging from a merging lane to the main line at an interchange (IC), a junction (JCT), a service area (SA), a parking area (PA), and the like, in addition to lane change in a general section such as a highway main line section with two or more lanes on one side.

Since lane change in the diverging section and merging section (collectively referred to as a specific section in contrast to the above-described general section) is lane change (intended lane change) having a purpose such as route selection to a destination or facility use, the lane change must be executed by necessity in order to accomplish the purpose.

Figure 5A:
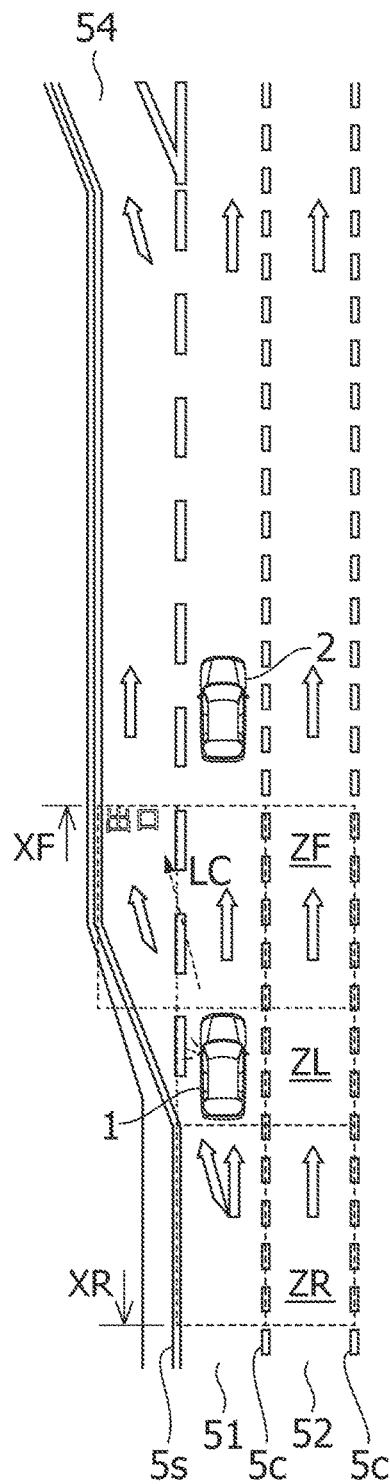
FIG. 5A is a schematic plan view exemplifying automated lane change in the diverging section.
Figure 5B:
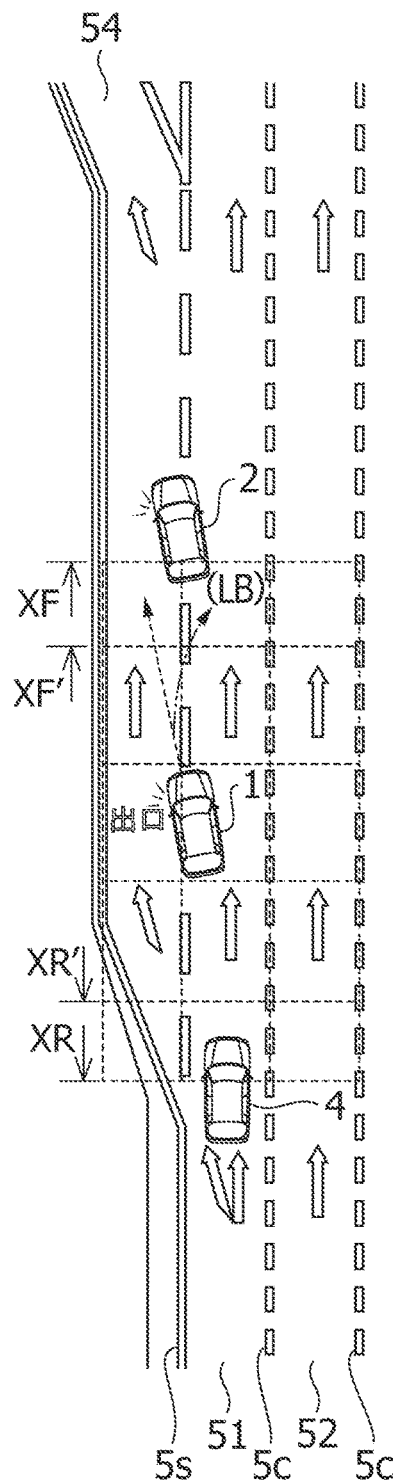
FIG. 5B is a schematic plan view exemplifying situation change during automated lane change in the diverging section.

However, for example, as shown in FIG. 5A, in a diverging section from a main line (driving lane 51) to a ramp way 54 at an interchange, a junction, or the like, when the vehicle 1 diverges from the driving lane 51 (main line) to the neighboring lane 54 (ramp way) by an automated lane change function LC in a situation in which, although there is a preceding other vehicle 2 ahead of the vehicle 1, the preceding other vehicle 2 is outside a front area ZF and there is no other vehicle in the front area ZF of a left side neighboring lane (ramp way 54), if the preceding other vehicle 2 changes to the left lane while decelerating, cuts in ahead, and enters the front area ZF as shown in FIG. 5B, it is determined that automated lane change cannot be continued, automated lane change is cancelled, and the original lane return function LB is performed, then the vehicle cannot shift to the diverging lane 54 contrary to the driver's intention and the driver may lose an opportunity for route selection to a destination or facility use.

Figure 6A:
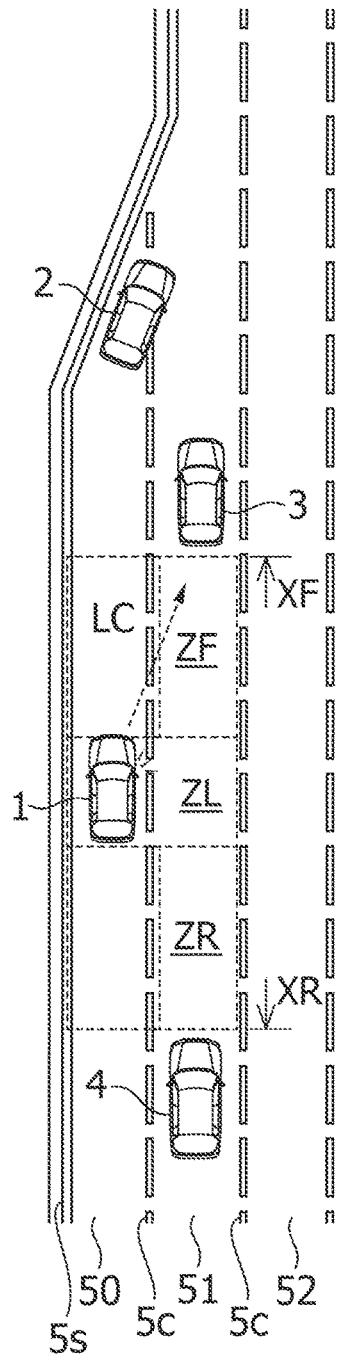
FIG. 6A is a schematic plan view exemplifying automated lane change in a merging section.
Figure 6B:
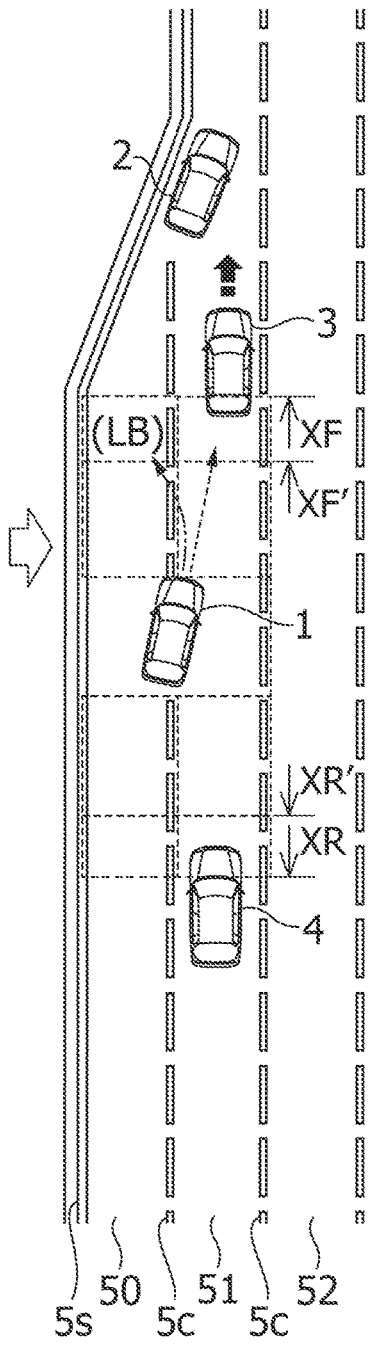
FIG. 6B is a schematic plan view exemplifying situation change during automated lane change in the merging section.

For example, as shown in FIG. 6A, in a merging section from a ramp way 50 to a main line (driving lane 51) at an interchange, a junction, or the like, when the vehicle 1 merges from the driving lane 50 (ramp way) to the neighboring lane 51 (main line) by the automated lane change function LC in a situation in which, although there is a preceding other vehicle 2 ahead of the vehicle 1, and there are a preceding other vehicle 3 ahead and a succeeding other vehicle 4 behind in the neighboring lane 51 (main line), they are all outside the front area ZF and a rear area ZR, and there is no other vehicle in the front area ZF, rear area ZR, and a lateral area ZL of a neighboring lane 53, if the preceding other vehicle 2 merges to the neighboring lane 51 (main line), causing the preceding other vehicle 3 in the neighboring lane 51 to sudden apply the brake and to enter the front area ZF as shown in FIG. 6B, it is determined automated lane change cannot be continued, automated lane change is cancelled, and the original lane return function LB is performed, the driver may lose an opportunity for merging to the main line 51, contrary to the driver's intention.

Furthermore, in the case of driving in a driving lane (such as a center lane 52) other than a diverging side lane (left side lane 51 in FIGS. 5A, 5B, and 5C) in the main line (general section) before the diverging section such as the interchange or junction described before, it is necessary to change the lane to the diverging side lane (left side lane 51) before reaching the diverging section, and also in such preparatory lane change in the general section before the diverging section, if the original lane return function LB is performed, it is not possible to shift to the diverging lane 54 and the driver may lose an opportunity for route selection to a destination or facility use.

Unintended Original Lane Return Prevention Function during Lane Change in Specific Section The automated driving controller 10 according to the present invention detects the vehicle's own position with respect to the specific section (diverging section Zd and merging section Zc) such as an interchange, a junction, or the like by matching the vehicle's own position information by the positioning means 24 such as a GPS and the map information 23, and has an unintended original lane return prevention function that changes predetermined areas serving as a criterion for automated lane change continuation determination to predetermined areas for the specific section (front predetermined distance XF' and rear predetermined distance XR') smaller than predetermined areas for the general section (front predetermined distance XF and rear predetermined distance XR) if the vehicle's own position is in or near the specific section.

The predetermined areas for the specific section (front predetermined distance XF' and rear predetermined distance XR') applied to the automated lane change continuation determination in the diverging section Zd and merging section Zc are set, for example, as follows with respect to the predetermined areas for the general section (front predetermined distance XF and rear predetermined distance XR).

Front predetermined distance (XF')=minimum inter-vehicle distance ($S_O$)+vehicle head time (TH)×speed of the vehicle (V), where, minimum inter-vehicle distance ($S_O$)=speed of the vehicle (V)×inter-vehicle time (TG'); and inter-vehicle time (TG')=minimum inter-vehicle time ($TG_{min}$) or TG>TG'>$TG_{min}$.

Rear predetermined distance (XR')=vehicle head time (TH')×speed of vehicle behind (Vr), where, vehicle head time (TH')=vehicle head distance/V=TTC'×ΔV/V;

TTC'=ΔV/vehicle behind maximum deceleration ($Dr_{max}$), or

TTC'=ΔV/vehicle behind deceleration (Dr'), Dr<Dr'<$Dr_{max}$.

That is, the predetermined areas for the specific section (front predetermined distance XF' and rear predetermined distance XR') are selected from values that are smaller than the predetermined areas for the general section (front predetermined distance XF and rear predetermined distance XR) and equal to or larger than minimum predetermined areas (minimum front predetermined distance and minimum rear predetermined distance), respectively.

Since the front predetermined distance XF' and rear predetermined distance XR' that define the predetermined areas for the specific area also vary depending on the vehicle speeds V, VF, and Vr of the vehicle, vehicle ahead, and vehicle behind, respectively, a lookup table for the specific section storing calculated values for each of the speed of the vehicle (V) and relative speed (ΔV) for each is prepared, and corresponding values are applied by a reference process.

The partially automated lane change system (PALS) is linked to a navigation apparatus that executes path guidance on the basis of the vehicle's own position information by the positioning means 24 such as a GPS and the map information 23 and it is determined that lane change (diverging and merging) according with path guidance by the navigation apparatus is lane change with purpose (intended lane change) such as route selection to a destination or facility use when passing through the specific section (diverging section or merging section) on a path set to the navigation apparatus. Automated lane change by system determination is on the presumption of such a determination of the navigation apparatus.

Therefore, in the case in which system determination is approved by the driver's blinker operation and automated lane change is executed instead of execution by system determination or in the case in which automated lane change is executed triggered by the driver's blinker operation, if the driver changes the lane by blinker operation in an opposite direction to the determination of the navigation apparatus, it is recognized as lane change in the general section and the predetermined areas in the lane change continuation determination as described above are not applied.

Unintended Original Lane Return Prevention Flow during Lane Change in Specific Section: Working Example 1

Figure 4:
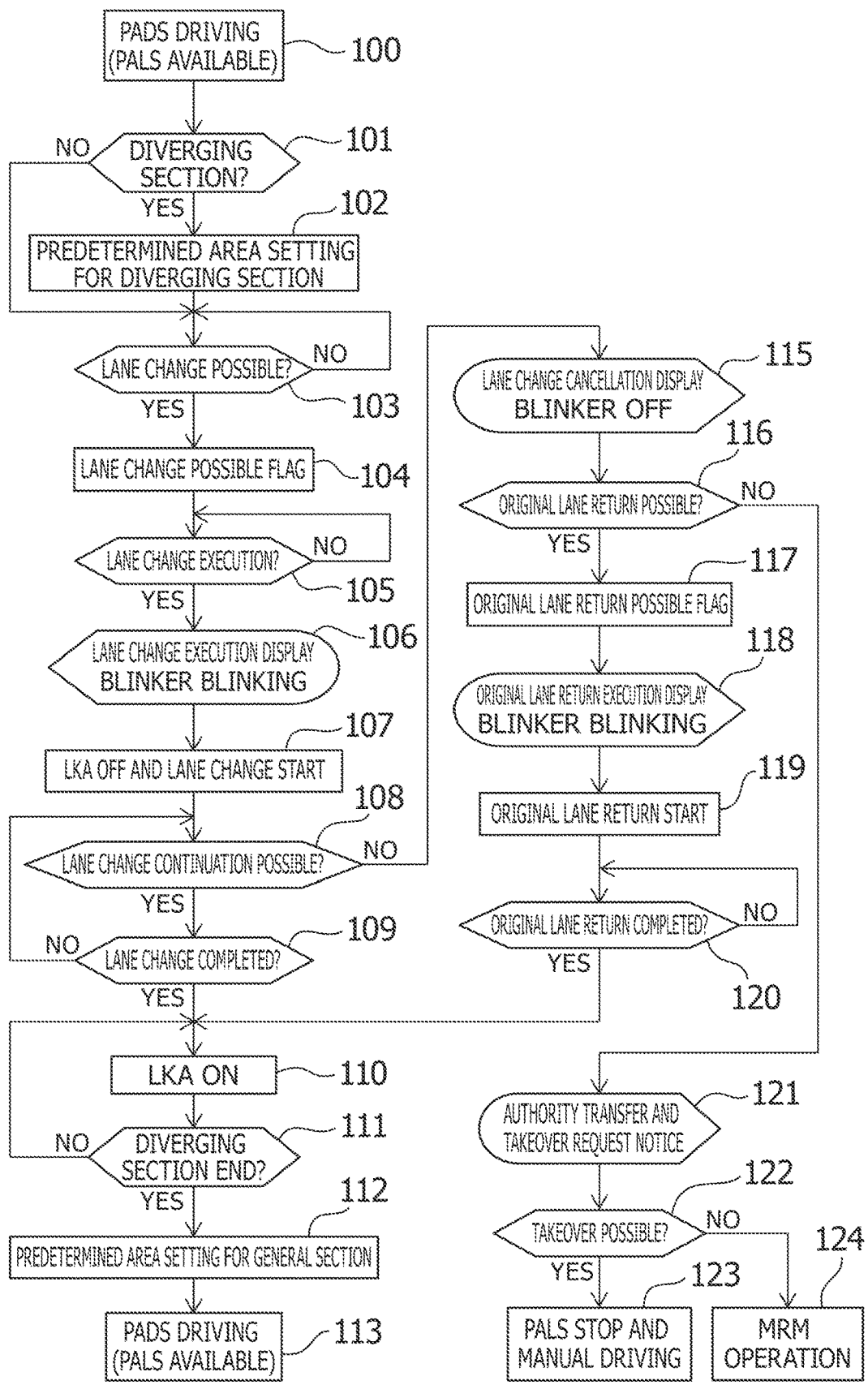
FIG. 4 is a flowchart showing unintended original lane return prevention control during lane change in a diverging section.

Next, an unintended original lane return prevention flow during automated lane change in a diverging section on a highway will be described with reference to FIG. 4.

(1) Partially Automated In-Lane Driving (PALS driving)

When the partially automated lane change system (PALS) is operating during PADS (ACCS and LKAS) driving by the partially automated in-lane driving system, a criterion (automated lane change start condition) of lane change determination in automated lane change is set to the predetermined areas for the general section (front predetermined distance XF and rear predetermined distance XR), and during PADS driving, whether there is another vehicle in the predetermined areas (front area ZF, rear area ZR, and lateral area ZL) of the neighboring lane is monitored by the environmental condition estimating part 11 (external sensor 21) (step 100).

(2) Diverging Section Determination

While the partially automated lane change system (PALS) is operating, whether the vehicle's driving position is in the general section such as a highway main line or in the diverging section Zd to an interchange, a junction, a service area, a parking area, or the like (or the merging section Zc from those or the specific section including the section where preparatory lane change is expected before the diverging section or the like) is constantly determined by matching the vehicle's own position information by the positioning means 24 such as a GPS and the map information 23 (step 102).

(3) Predetermined Area Setting in Diverging Section

If the vehicle's driving position is in the diverging section Zd (or the merging section Zc or the specific section including the section where preparatory lane change is expected before the diverging section Zd), the predetermined areas serving as the criterion for automated lane change continuation determination are changed to the predetermined areas for the diverging section (specific section) (front predetermined distance XF' and rear predetermined distance XR') smaller than the predetermined areas for the general section (front predetermined distance XF and rear predetermined distance XR) (step 103).

If the vehicle's driving position is in the general section such as the highway main line (excluding the section where preparatory lane change is expected before the diverging section Zd), the predetermined areas for the general section (front predetermined distance XF and rear predetermined distance XR) are maintained.

(4) Lane Change Execution Determination

When the vehicle's driving position is in the diverging section Zd (or the merging section Zc from those or the specific section including the section where preparatory lane change is expected before the diverging section Zd), in a situation in which it is determined that there is no other vehicle in the predetermined area (front predetermined distance XF') (in the front predetermined distance XF', rear predetermined distance XR', and lateral area ZL in the merging section) of a diverging lane (neighboring lane) and an automated lane change possible flag is set (step 104), automated lane change is executed setting the center of the neighboring lane as a target position by system determination or blinker operation to the neighboring lane direction by the driver (step 105).

(5) Lane Change Execution Display and Blinker Blinking

The driver is notified of lane change execution by display in a head-up display or meter panel or voice at the same time as determining the execution of automated lane change, and blinker blinking on the diverging lane side is started (step 106).

(6) LKA Off and Automated Lane Change Start

When a predetermined time (for example, three seconds) passes after the blinker starts blinking, the LKA function (lane keeping function) is turned off, and automated lane change is started setting the center of the neighboring lane as the target position (step 107).

(7) Lane Change Continuation Determination

Also during automated lane change, whether there is another vehicle in the predetermined areas (predetermined areas for the diverging section, front predetermined distance XF' and rear predetermined distance XR') of the neighboring lane is monitored by the environmental condition estimating part 11 (external sensor 21) (step 108), and if there is no other vehicle in the predetermined areas for the diverging section (front predetermined distance XF' and rear predetermined distance XR'), lane change continues.

Even if another vehicle is confirmed in the predetermined areas for the diverging section (front predetermined distance XF' and rear predetermined distance XR'), when the vehicle has almost moved to the neighboring lane, for example, when three or more of four wheels have entered the neighboring lane crossing the lane marking, lane change is not cancelled and lane change continues.

In this way, in the diverging section, because predetermined areas serving as the criterion of the automated lane change continuation determination are changed in advance to the predetermined areas for the diverging section (front predetermined distance XF' and rear predetermined distance XR') smaller than the predetermined areas for the general section (front predetermined distance XF and rear predetermined distance XR), even if a vehicle ahead cuts in or suddenly decelerates, the vehicle ahead hardly enters the predetermined areas, and lane change to the diverging lane can be continued excluding special cases.

(8) Lane Change Completion Determination

If lane change continues, a lane change completion determination is made on the basis of the vehicle's own position with respect to the lane markings. It is determined that lane change has been completed when the vehicle's deviation from a target lateral position (for example, the center of a diverging destination lane) of lane change is within a predetermined value (for example, diverging lane center±0.5 m) (step 109).

(9) LKA On and PALS Driving

If it is determined that lane change has been completed, the LKA function (lane keeping function) is turned on, and PADS (ACCS and LKAS) driving by the partially automated in-lane driving system is resumed (step 110).

(10) Diverging Section End Determination

It is determined whether the vehicle's driving position at the time of lane change completion is outside the lane diverging section (step 111), and if the vehicle's driving position is outside the lane diverging section, the predetermined areas are changed to the predetermined areas for the general section (front predetermined distance XF and rear predetermined distance XR) (step 112).

(11) Lane Change Cancellation Display and Blinker Off

On the other hand, if it is confirmed that another vehicle has entered the predetermined areas for the diverging section (front predetermined distance XF' and rear predetermined distance XR') in step 108 due to a change in the surrounding environment such as sudden lane change or sudden braking of another vehicle after the determination of automated lane change execution and the blinker starting blinking, the driver is notified of lane change cancellation by display in a head-up display or by meter panel or by sound, and at the same time, the blinker on the diverging lane side is turned off (step 115).

(12) Original Lane Change Determination

At the same time, it is determined whether original lane return is possible by an automated original lane return function (step 116), and if it is determined that original lane return is possible, a lane change possible flag is set (step 117), a blinker on the original lane side is blinked (step 118), and original lane return by the automated original lane return function is started (step 119). It is determined that original lane return is completed when the vehicle's deviation from the center of the original lane is within a predetermined value (step 120).

(13) Authority Transfer, Takeover Request Display, and Alarm

When another vehicle is confirmed in the predetermined areas of the original lane side (front predetermined distance XF' and rear predetermined distance XR') due to approach or the like of a vehicle ahead or vehicle behind in the original lane in step 116, the automated original lane return function is not performed, the driver is notified of an operation takeover request by display in a head-up display or by a meter panel or by sound (step 121), the automated lane change is cancelled, and control is transferred to the driver.

(14) Takeover Determination

It is determined whether the driver has taken over steering in response to the authority transfer, takeover request display, and alarm (step 122). In the takeover determination, it is determined that operation is taken over when a steering torque by the driver exceeds a predetermined value. If the driver cannot take over operation until the elapse of a predetermined time (for example, four seconds), a minimal risk maneuver (MRM) is performed (step 124). The MRM is a self-driving form in an emergency by automatic steering and braking, and the vehicle evacuates to a road shoulder or the like and stops by the MRM.

(15) PALS Stop and Manual Driving

When the driver takes over driving operation, the PALS function is stopped to shift to manual driving by the driver (step 123).

(Unintended Original Lane Return Prevention Flow during Lane Change in Specific Section: Working Example 2)

Figure 7:
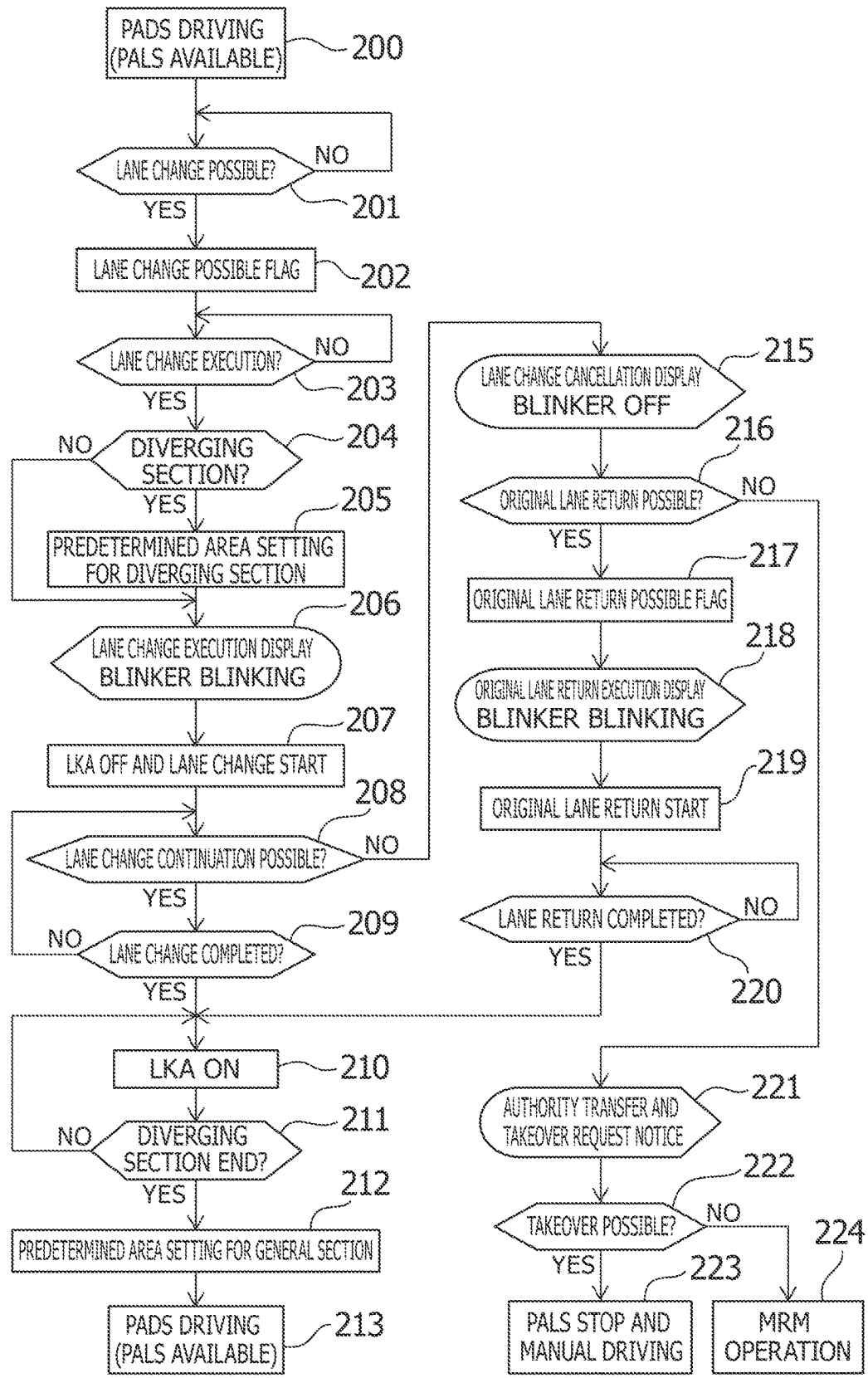
FIG. 7 is a flowchart showing another example of unintended original lane return prevention control during lane change in the diverging section.

In the above example, although the case is described where in the diverging section or the like of a highway, the predetermined areas serving as the automated lane change start condition and the criterion for the automated lane change continuation determination are changed in advance to the predetermined areas for the diverging section (front predetermined distance XF' and rear predetermined distance XR') smaller than the predetermined areas for the general section (front predetermined distance XF and rear predetermined distance XR), it is possible to change in advance only the predetermined areas serving as the criterion for the automated lane change continuation determination to the predetermined areas for the diverging section (front predetermined distance XF' and rear predetermined distance XR') smaller than the predetermined areas for the general section (front predetermined distance XF and rear predetermined distance XR) without changing the predetermined areas serving as the automated lane change start condition. Hereinafter, an unintended original lane return prevention flow that changes only the predetermined areas serving as the criterion of the automated lane change continuation determination will be described with reference to FIG. 7.

(1) Partially Automated In-Lane Driving (PALS Driving)

When the partially automated lane change system (PALS) is operating during PADS (ACCS and LKAS) driving by the partially automated in-lane driving system, the predetermined areas serving as the criterion for the automated lane change continuation determination are set to the predetermined areas for the general section (front predetermined distance XF and rear predetermined distance XR) (step 200).

The above predetermined areas for the general section are the same as the criterion for the lane change determination (automated lane change start condition) in automated lane change by the partially automated lane change system (PALS), and during PADS (ACCS and LKAS) driving by the partially automated in-lane driving system, whether there is another vehicle in the predetermined areas (front area ZF, rear area ZR, and lateral area ZL) of the neighboring lane is monitored by the environmental condition estimating part 11 (external sensor 21) (step 201).

(2) Lane Change Execution Determination

When it is determined that there is no other vehicle in the front area ZF, rear area ZR, and lateral area ZL of the neighboring lane and the automated lane change possible flag is set (step 202), automated lane change is executed setting the center of the neighboring lane as a target position by system determination or blinker operation to the neighboring lane direction by the driver (step 203).

(3) Diverging Section Determination

When the partially automated lane change system (PALS) is operating, whether the vehicle's driving position is in the general section such as the highway main line or in the diverging section Zd to the interchange, junction, service area, parking area, or the like (or the merging section Zc from those or the specific section including the section where preparatory lane change is expected before the diverging section or the like) is constantly determined by matching the vehicle's own position information by the positioning means 24 such as a GPS and the map information 23 (step 204).

(4) Predetermined Area Setting in Diverging Section

If the vehicle's driving position is in the diverging section Zd (or the merging section Zc from those or the specific section including the section where preparatory lane change is expected before the diverging section Zd), the predetermined areas serving as the criterion for the automated lane change continuation determination are changed to the predetermined areas for the diverging section (specific section) (front predetermined distance XF' and rear predetermined distance XR') smaller than the predetermined areas for the general section (front predetermined distance XF and rear predetermined distance XR) (step 205).

If the vehicle's driving position is in the general section such as the highway main line (excluding the section where preparatory lane change is expected before the diverging section Zd), the predetermined areas for the general section (front predetermined distance XF and rear predetermined distance XR) are maintained.

(5) Lane Change Execution Display and Blinker Blinking

The driver is notified of lane change execution by display in a head-up display or by meter panel or by sound at the same time as determining the execution of automated lane change, and blinker blinking on the diverging lane side is started (step 206).

(6) LKA Off and Automated Lane Change Start

When the predetermined time (for example, three seconds) passes after the blinker starts blinking, the LKA function (lane keeping function) is turned off, and automated lane change is started setting the center of the neighboring lane as a target position (step 207).

(7) Lane Change Continuation Determination

Also during automated lane change, whether there is another vehicle in the predetermined areas (predetermined areas for the diverging section, front predetermined distance XF' and rear predetermined distance XR') of the neighboring lane is monitored by the environmental condition estimating part 11 (external sensor 21) (step 208), and if there is no other vehicle in the predetermined areas for the diverging section (front predetermined distance XF' and rear predetermined distance XR'), lane change continues.

Even if another vehicle is confirmed in the predetermined areas for the diverging section (front predetermined distance XF' and rear predetermined distance XR'), when the vehicle has almost moved to the neighboring lane, for example, when three or more of four wheels have entered the neighboring lane crossing the lane marking, lane change is not cancelled and lane change continues.

(8) Lane Change Completion Determination

If lane change continues, a lane change completion determination is made on the basis of the vehicle's own position with respect to the lane markings. It is determined that lane change has been completed when the vehicle's deviation from a target lateral position (for example, the center of a diverging destination lane) of lane change is within the predetermined value (for example, diverging lane center±0.5 m) (step 209).

(9) LKA On and PALS Driving

If it is determined that lane change has been completed, the LKA function (lane keeping function) is turned on, and PADS (ACCS and LKAS) driving by the partially automated in-lane driving system is resumed (step 210).

(10) Diverging Section End Determination

It is determined whether the vehicle's driving position at the time of lane change completion is outside the lane diverging section (step 211), and if the vehicle's driving position is outside the lane diverging section, the predetermined areas are changed to the predetermined areas for the general section (front predetermined distance XF and rear predetermined distance XR) (step 212).

When, in step 208, another vehicle is confirmed in the predetermined areas for the diverging section (front predetermined distance XF' and rear predetermined distance XR'), a flow (steps 215-224) of cancelling lane change is the same as steps 115-124 in Example 1 described before.

Although the unintended original lane return prevention flow in the diverging section on the highway is described in the above example, the similar flow is also applicable to cases of the merging section and preparatory lane change in the general section before the diverging section, and the predetermined areas for the specific section (front predetermined distance XF' and rear predetermined distance XR') in each case are also dynamically set depending on vehicle speed or the like in the same way.

Operation and Effects

As detailed above, because the driving control apparatus for the vehicle according to the present invention is configured so that, when the vehicle's own position is in the specific section such as the lane diverging section or lane merging section during execution of automated lane change, the predetermined areas serving as the criterion of the lane change continuation determination are changed to second predetermined areas smaller than those when the vehicle's own position is in the general area, effects of reducing unintended original lane return can be expected in each case exemplified below.

Example 1

Interruption of Other Vehicle in Lane Diverging Section

Figure 5C:
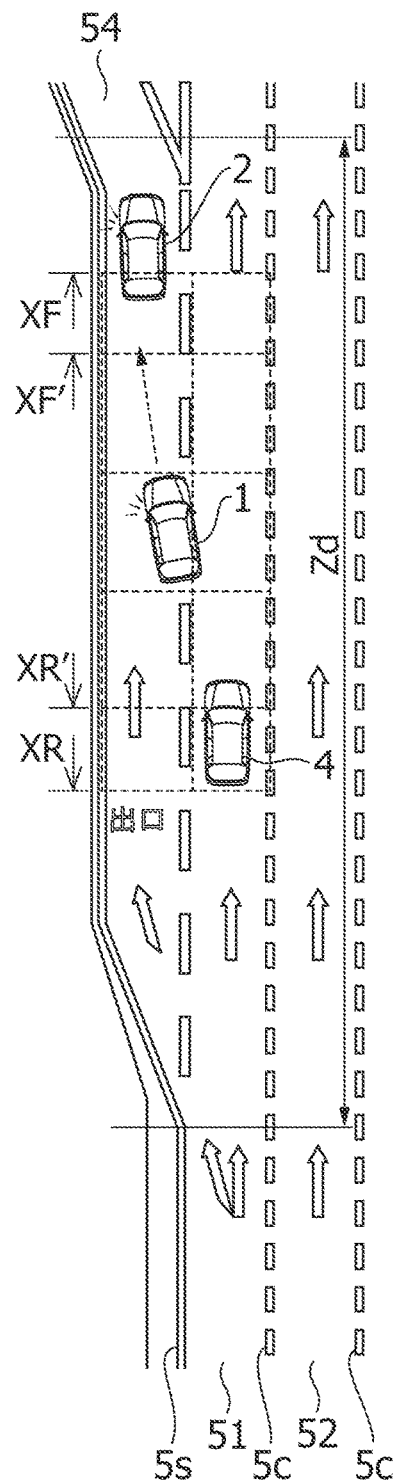
FIG. 5C is a schematic plan view exemplifying unintended original lane return prevention control during lane change in the diverging section.

As shown in FIG. 5A, in a lane diverging section from a main line to a ramp way before an interchange, a junction, a service area, and a parking area, when the vehicle 1 diverges from the vehicle's own driving lane 51 (main line) to the neighboring lane 50 (ramp way) by the automated lane change LC in a situation in which although there is a preceding other vehicle 2 ahead in the vehicle 1's own driving lane 51 (main line), the preceding other vehicle 2 is outside the front area ZF and there is no other vehicle in the front area ZF of a left side neighboring lane 50 (ramp way), even if the preceding other vehicle 2 changes to the left lane while decelerating and cuts in ahead as shown in FIG. 5B, it is not recognized as an intrusion into the predetermined area (front predetermined distance XF') because the predetermined areas serving as the criterion of the automated lane change continuation determination are changed in advance to the predetermined areas for the diverging section (front predetermined distance XF' and rear predetermined distance XR'), and as shown in FIG. 5C, lane change continues, lane change to the diverging lane 54 can be completed, and diverging opportunity loss due to automated lane change cancellation and operation of the original lane return function can be avoided.

Example 2

Sudden Braking of Other Vehicle in Lane Merging Section

Figure 6C:
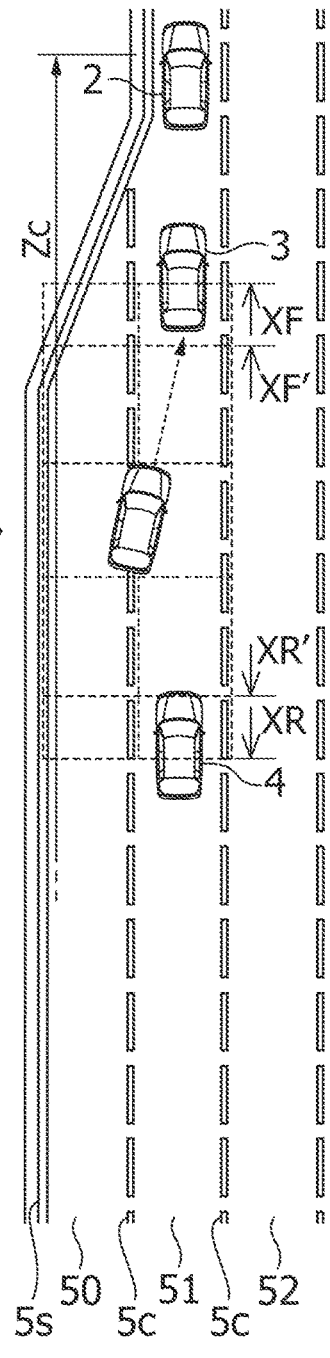
FIG. 6C is a schematic plan view exemplifying unintended original lane return prevention control during automated lane change in the merging section.

As shown in FIG. 6A, in a merging section from a ramp way to a main line at an interchange, a junction, or the like, when the vehicle 1 merges from the vehicle's own driving lane 50 (ramp way) to a right side neighboring lane 51 (main line) by the automated lane change LC in a situation in which although there is a preceding other vehicle 2 ahead in the vehicle 1's own driving lane 50 (ramp way) and there are a preceding other vehicle 3 ahead and a succeeding other vehicle 4 behind in the right side neighboring lane 51 (main line), they are all outside the front area ZF and rea area ZR, and there is no other vehicle in the front area ZF, rear area ZR, and lateral area ZL of a neighboring lane 53, even if the preceding other vehicle 2 merges to the neighboring lane 51 (main line) causing the preceding other vehicle 3 in the neighboring lane 51 to sudden apply the brake as shown in FIG. 6B, it is not recognized as intrusion to the predetermined area (front predetermined distance XF') because the predetermined areas serving as the criterion of the automated lane change continuation determination are changed in advance to the predetermined areas for the merging section (front predetermined distance XF' and rear predetermined distance XR'), or it is not recognized as an intrusion into the predetermined area (rear predetermined distance XR') when the succeeding other vehicle 4 approaches, and as shown in FIG. 6C, merging to the neighboring lane 51 (main line) can be completed, and merging opportunity loss due to automated lane change cancellation and operation of the original lane return function can be avoided.

Example 3

Interruption of Other Vehicle during Preparatory Lane Change in General Section

In the case of driving in a driving lane (such as a center lane 52) other than a diverging side lane (left side lane 51 in FIGS. 5A, 5B, and 5C) in the main line section (general section) before the lane diverging section to the interchange, junction, service area, parking area, or the like shown in FIGS. 5A, 5B, and 5C, it is necessary to change the lane to the diverging side lane (left side lane 51) before reaching the diverging section, and even when a preceding other vehicle or succeeding other vehicle approaches during such preparatory lane change in the general section before the diverging section, it is not recognized as an intrusion into the predetermined areas (front predetermined distance XF' and rear predetermined distance XR') because the predetermined areas serving as the criterion of the automated lane change continuation determination are changed in advance to the predetermined areas for the diverging section (front predetermined distance XF' and rear predetermined distance XR'), and automated lane change continues, thereby preparatory lane change to the diverging side lane (left side lane 51) can be completed, and diverging opportunity loss due to automated lane change cancellation and operation of the original lane return function can be avoided.

Other than preparatory lane change in the general section before the diverging section as described above, also in preparatory lane change in consideration of entering a desired target gate before a main line toll booth on a highway or the like, preparatory lane change to a right side lane for a right turn or entering a right turn lane, and preparatory lane change to a left side lane for a left turn or entering a left turn lane at a cross section of a main road with three or more lanes on one side, the unintended original lane return prevention function according to the present invention can be implemented.

Although the above embodiment illustrates the case of detecting the vehicle's own position with respect to the diverging section (specific section) at an interchange, a junction, or the like by matching the vehicle's own position information by the positioning means 24 such as a GPS and the map information 23, it is also possible to configure to detect the vehicle's own position with respect to the diverging section (specific section) by image recognition for a guide display or a display object such as a distance mark detected by the external sensor 21.

In that case, a direction for lane change in the diverging section (specific section) by the image recognition is detected in advance (left lane change estimation flag or right lane change estimation flag), then it is determined whether lane change executed in the section is suitable for a purpose in the section, it is regarded as an intended lane change if it is suitable, and the predetermined areas for the diverging section (front predetermined distance XF' and rear predetermined distance XR') may be applied for the lane change continuation determination.

In the embodiment, although the case is described in which the predetermined areas for the general section serving as the criterion of the lane change continuation determination is the same as the predetermined area serving as the criterion of the lane change determination, the predetermined areas for the general section may be set smaller than the predetermined areas serving as the criterion of the lane change determination in ranges larger than the predetermined areas for the specific section.

Although some embodiments of the present invention have been described above, the present invention is not limited to the embodiments, and various modifications and changes are possible within the scope of the present invention.

REFERENCE SIGNS LIST

10 Automated driving controller
11 Environmental condition estimating part
12 Path generating part
13 Vehicle control part
14 ACC controller
15 LKA controller
21 External sensor
22 Internal sensor
31 EPS controller
32 Engine controller
33 ESP/ABS controller
34 Manual steering (steering wheel)

41 Steering mechanism
42 Engine
43 Brake

The invention claimed is:

1. A driving control apparatus for a vehicle, comprising:
an environmental condition estimating part including a surrounding recognition function for recognizing a vehicle's driving lane, neighboring lanes, and other vehicles driving in the driving lanes and a function for obtaining the vehicle's moving state;
a path generating part for generating a target path on the basis of information obtained by the environmental condition estimating part; and
a vehicle control part configured to perform speed control and steering control for causing the vehicle to follow the target path, and having:
a function for performing automated lane change to a neighboring lane when there is no other vehicle in a predetermined range of the neighboring lane; and
a function for determining whether lane change should be continued when another vehicle is recognized in a predetermined area around the vehicle during execution of the automated lane change,
wherein the driving control apparatus has a function for altering the predetermined area serving as a criterion of the continuation determination of lane, when the vehicle's own position is in a specific section including a lane diverging section during execution of the automated lane, to a second predetermined area smaller than the predetermined area when the vehicle's own position is in a general section other than the specific section.

2. The driving control apparatus for the vehicle according to claim 1, wherein the specific section further includes a lane merging section.

3. The driving control apparatus for the vehicle according to claim 1, wherein the specific section further includes a section before lane diverging where preparatory lane change to an outermost lane is executed for lane change in the lane diverging section.

4. The driving control apparatus for the vehicle according to claim 1, wherein the predetermined area is defined by front predetermined distance, rear predetermined distance, and lateral predetermined distance of the vehicle, and the second predetermined area has the front predetermined distance and the rear predetermined distance shortened.

5. The driving control apparatus for the vehicle according to claim 1, wherein when the specific section is the lane diverging section, the predetermined area is defined by front predetermined distance and lateral predetermined distance of the vehicle, and the second predetermined area has only the front predetermined distance shortened.

6. The driving control apparatus for the vehicle according to claim 1, further comprising a navigation function for executing path guidance on the basis of the vehicle's own position information by positioning means and map information, wherein when the vehicle's own position is in the specific section during execution of the automated lane change, the second predetermined area is applied to intended lane change according with the path guidance by the navigation function.

* * * * *